(12) United States Patent
Holmes

(10) Patent No.: US 12,311,767 B1
(45) Date of Patent: May 27, 2025

(54) HYBRID PROPULSION SYSTEM

(71) Applicant: GM Global Technology Operations LLC, Detroit, MI (US)

(72) Inventor: Alan G. Holmes, Clarkston, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 18/927,580

(22) Filed: Oct. 25, 2024

(51) Int. Cl.
| | |
|---|---|
| *B60K 6/365* | (2007.10) |
| *B60K 6/387* | (2007.10) |
| *B60K 6/40* | (2007.10) |
| *B60K 6/52* | (2007.10) |
| *B60W 10/02* | (2006.01) |
| *B60W 10/06* | (2006.01) |
| *B60W 10/08* | (2006.01) |
| *B60W 20/40* | (2016.01) |
| *B60K 6/26* | (2007.10) |
| *B60K 6/38* | (2007.10) |

(52) U.S. Cl.
CPC .............. *B60K 6/365* (2013.01); *B60K 6/387* (2013.01); *B60K 6/40* (2013.01); *B60K 6/52* (2013.01); *B60W 10/02* (2013.01); *B60W 10/06* (2013.01); *B60W 10/08* (2013.01); *B60W 20/40* (2013.01); *B60K 2006/266* (2013.01); *B60K 2006/381* (2013.01); *B60W 2520/10* (2013.01); *B60W 2710/021* (2013.01); *B60W 2710/06* (2013.01); *B60W 2710/08* (2013.01)

(58) Field of Classification Search
CPC .......... B60K 6/365; B60K 6/387; B60K 6/40; B60K 2006/381; B60K 6/52; B60K 2006/266; F16H 3/727; F16H 2200/0017; F16H 2200/0021

USPC .............................. 475/5, 8, 204, 219; 477/5
See application file for complete search history.

(56) References Cited

U.S. PATENT DOCUMENTS

| | | | |
|---|---|---|---|
| 6,234,930 B1 * | 5/2001 | Kaneko ................. | B60W 10/26 475/5 |
| 7,086,977 B2 * | 8/2006 | Supina .................... | B60L 15/20 475/5 |
| 2009/0051304 A1 * | 2/2009 | Muta ........................ | B60L 7/26 903/947 |

(Continued)

FOREIGN PATENT DOCUMENTS

CN 114670616 A * 6/2022

OTHER PUBLICATIONS

English translation of CN114670616A; https://translationportal.epo.org; Mar. 27, 2025 (Year: 2025).*

*Primary Examiner* — Roger L Pang
(74) *Attorney, Agent, or Firm* — Vivacqua Crane, PLLC

(57) ABSTRACT

A hybrid propulsion system for a vehicle includes a battery for storing electrical energy, a power controller adapted to route electrical energy to and from the battery, a hybrid transaxle positioned between and interconnecting an engine and a first drive axle, the hybrid transaxle including a planetary gear set including a sun gear, planet gears rotationally supported on a carrier, and a ring gear, the carrier continuously connected to the engine, a first electric motor/generator continuously connected to the sun gear of the planetary gear set, final drive gears continuously connected to and interconnecting the ring gear of the planetary gear set to the first drive axle, and a second electric motor/generator selectively connectable to the final drive gears through an intermediary gearset having a single gear ratio.

20 Claims, 5 Drawing Sheets

(56) References Cited

U.S. PATENT DOCUMENTS

2010/0279817 A1* 11/2010 Holmes .................. F16H 3/728
  477/4
2014/0155211 A1* 6/2014 Kozarekar ............. B60L 50/61
  475/5

* cited by examiner

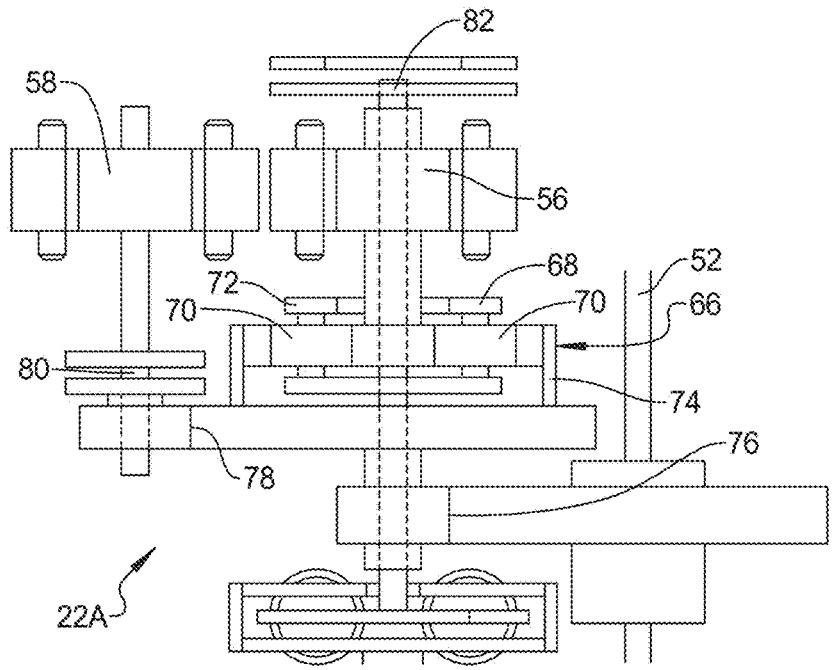

FIG. 2

| | OPERATION MODE | | BRAKE | FIRST CLUTCH | ENGINE |
|---|---|---|---|---|---|
| 1 | VEHICLE STANDBY | ELECTRIC | ON | ON | OFF |
| | | HYBRID | OFF | ON | LOW |
| 2 | FULL ACCELERATION (0-60 MPH) | ELECTRIC | ON | ON | OFF |
| | | HYBRID | OFF | ON | HIGH |
| 3 | HIGHWAY CRUISING (APPROX. 50 MPH) | ELECTRIC | ON | OFF | OFF |
| | | HYBRID | OFF | OFF | LOW |
| 4 | PASSING (50-80 MPH) | ELECTRIC | ON | OFF | OFF |
| | | HYBRID | OFF | OFF | HIGH |
| 5 | REGENERATIVE BRAKING (80-50 MPH) | ELECTRIC | ON | OFF | OFF |
| | | HYBRID | OFF | OFF | BRAKING |
| 6 | REGENERATIVE BRAKING (50-0 MPH) | ELECTRIC | ON | ON | OFF |
| | | HYBRID | OFF | ON | OFF |
| 7 | OBSTACLE CLIMB (HIGH TORQUE) | ELECTRIC | ON | ON | OFF |
| | | HYBRID | OFF | ON | OFF |

FIG. 3

HYBRID PROPULSION SYSTEM

INTRODUCTION

The present disclosure relates to a hybrid propulsion system for a vehicle that provides full electric all-wheel-drive operation and avoids losses associated with use of a large electric motor for a hybrid transaxle.

Hybrid propulsion systems incorporating traditional internal combustion engines in unison with electric motors are becoming more prevalent in automotive vehicles. The demands of hybrid-electric vehicles require use of electric motors that can provide torque and power needed to power the vehicle in various operating conditions.

Thus, while current systems achieve their intended purpose, there is a need for a new and improved hybrid propulsion system that allows an otherwise large electric motor of a hybrid transaxle to be selectively disconnected, allowing the electric motor to have a larger gear ratio and thus, be smaller than would otherwise be possible, without including in the hybrid transaxle the number, size, and weight of components necessary to provide multiple gear ratios or a variable drive ratio for the electric motor.

SUMMARY

According to several aspects of the present disclosure, a hybrid propulsion system for a vehicle includes a battery for storing electrical energy, a power controller adapted to route electrical energy to and from the battery, a hybrid transaxle positioned between and interconnecting an engine and a first drive axle, the hybrid transaxle including a planetary gear set including a sun gear, planet gears rotationally supported on a carrier, and a ring gear, the carrier continuously connected to the engine, a first electric motor/generator continuously connected to the sun gear of the planetary gear set, final drive gears continuously connected to and interconnecting the ring gear of the planetary gear set to the first drive axle, and a second electric motor/generator selectively connectable to the final drive gears through an intermediary gearset having a single gear ratio.

According to another aspect, the hybrid propulsion system further includes a first clutch positioned between the second electric motor/generator and the final drive gears, the first clutch adapted to selectively connect the second electric motor/generator to the final drive gears through the intermediary gearset.

According to another aspect, the hybrid propulsion system further includes an electric drive axle including a third electric motor/generator connected to a second drive axle, the power controller adapted to provide electrical energy to the third electric motor/generator from the first electric motor/generator when the second electric motor/generator is disconnected from the final drive gears of the hybrid transaxle.

According to another aspect, the hybrid propulsion system further includes a brake adapted to selectively stop rotation of the carrier of the planetary gear set when the engine is off.

According to another aspect, the hybrid propulsion system further includes a vehicle controller in communication with the power controller, the first clutch, the brake and sensors within the vehicle, wherein, the vehicle controller is adapted to actuate the first clutch to disconnect the second electric motor/generator from the final drive gears when the hybrid propulsion system is powering the vehicle with power from the battery and the engine is off to provide all electric power to both the first drive axle and the second drive axle.

According to another aspect, the hybrid propulsion system further includes a vehicle controller in communication with the power controller, the first clutch, the brake and sensors within the vehicle, wherein, the vehicle controller is adapted to actuate the first clutch to disconnect the second electric motor/generator from the final drive gears when the hybrid propulsion system is powering the vehicle above a first pre-determined vehicle speed that is less than a maximum vehicle speed and when the hybrid propulsion system is powering the vehicle with one of electric power from the battery, power from the engine, or electric power from the battery and power from the engine.

According to another aspect, the vehicle controller is adapted to actuate the first clutch to connect the second electric motor/generator to the final drive gears when the hybrid propulsion system is powering the vehicle below the first pre-determined vehicle speed.

According to another aspect, when operating in a hybrid mode of operation, the vehicle controller is adapted to actuate the first clutch to disconnect the second electric motor/generator from the final drive gears and power is provided to the first electric motor/generator and to the first drive axle from the engine and power is provided to the third electric motor/generator by the first electric motor/generator.

According to another aspect, intermediary gear set includes a first stage and a second stage positioned between and interconnecting the second electric motor/generator and the final drive gears, wherein, when the first clutch is actuated to transfer power from the second electric motor/generator, power from the second electric motor/generator is transferred to the final drive gears at a multi-stage single gear ratio through the first and second stages of the intermediary gear set.

According to another aspect, the first clutch comprises a second planetary gear set including a ring gear that is selectively held stationary, a plurality of planet pinions supported on a carrier, and a sun gear continuously engaged with the second electric motor/generator, wherein, when the ring gear is held stationary, the second planetary gear set transfers power from the second electric motor/generator to the final drive gears, and when the ring gear is not held stationary, second planetary gear set does not transfer power from the second electric motor/generator to the final drive gears.

According to another aspect, the hybrid transaxle is oriented wherein an engine crankshaft is parallel to the first drive axle.

According to another aspect, the hybrid transaxle is oriented wherein an engine crankshaft is perpendicular to the first drive axle.

According to another aspect, the electric transaxle includes a second clutch positioned between the third electric motor/generator and the second drive axle, the second clutch adapted to selectively connect the third electric motor/generator to the second drive axle.

According to several aspects of the present disclosure, a method of operating a hybrid propulsion system for a vehicle including a battery for storing electrical energy, a power controller adapted to route electrical energy to and from the battery, a hybrid transaxle positioned between and interconnecting an engine and a first drive axle, the hybrid transaxle including a planetary gear set including a sun gear, planet gears rotationally supported on a carrier, and a ring gear, the carrier continuously connected to the engine, a first electric motor/generator continuously connected to the sun gear of the planetary gear set, final drive gears continuously connected to and interconnecting the ring gear of the planetary gear set to the first drive axle, a second electric motor/generator selectively connectable to the final drive gears through an intermediary gearset having a single gear ratio, and a first clutch positioned between the second electric motor/generator and the final drive gears, the first clutch adapted to selectively connect the second electric motor/generator to the final drive gears through the intermediary gearset, an electric transaxle including a third electric motor/generator connected to a second drive axle, the power controller adapted to provide electrical energy to the third electric motor/generator from the first electric motor/generator when the second electric motor/generator is disconnected from the final drive gears of the hybrid transaxle, and a brake adapted to selectively stop rotation of the carrier of the planetary gear set when the engine is off, includes actuating, with a vehicle controller in communication with the power controller, the first clutch, the brake and sensors within the vehicle, the first clutch and disconnecting the second electric motor/generator from the final drive gears when the hybrid propulsion system is powering the vehicle above a first pre-determined vehicle speed that is less than a maximum vehicle speed.

According to another aspect, the method further includes actuating, with the vehicle controller, the first clutch and connecting the second electric motor/generator to the final drive gears when the hybrid propulsion system is powering the vehicle below the first pre-determined vehicle speed.

According to another aspect, the method further includes actuating the first clutch to disconnect the second electric motor/generator from the final drive gears when the hybrid propulsion system is powering the vehicle with power from the battery and the engine is off to provide all electric power to both the first drive axle and the second drive axle.

According to another aspect, the method further includes when operating in a hybrid mode of operation, actuating, with the vehicle controller, the first clutch to disconnect the second electric motor/generator from the final drive gears, providing power to the first electric motor/generator and to the first drive axle from the engine, and providing power to the third electric motor/generator from the first electric motor/generator.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is an enlarged view of the hybrid transaxle of the hybrid propulsion system shown in FIG. 1;

FIG. 3 is a chart illustrating operating modes of the hybrid propulsion system;

DETAILED DESCRIPTION

Figure 1:
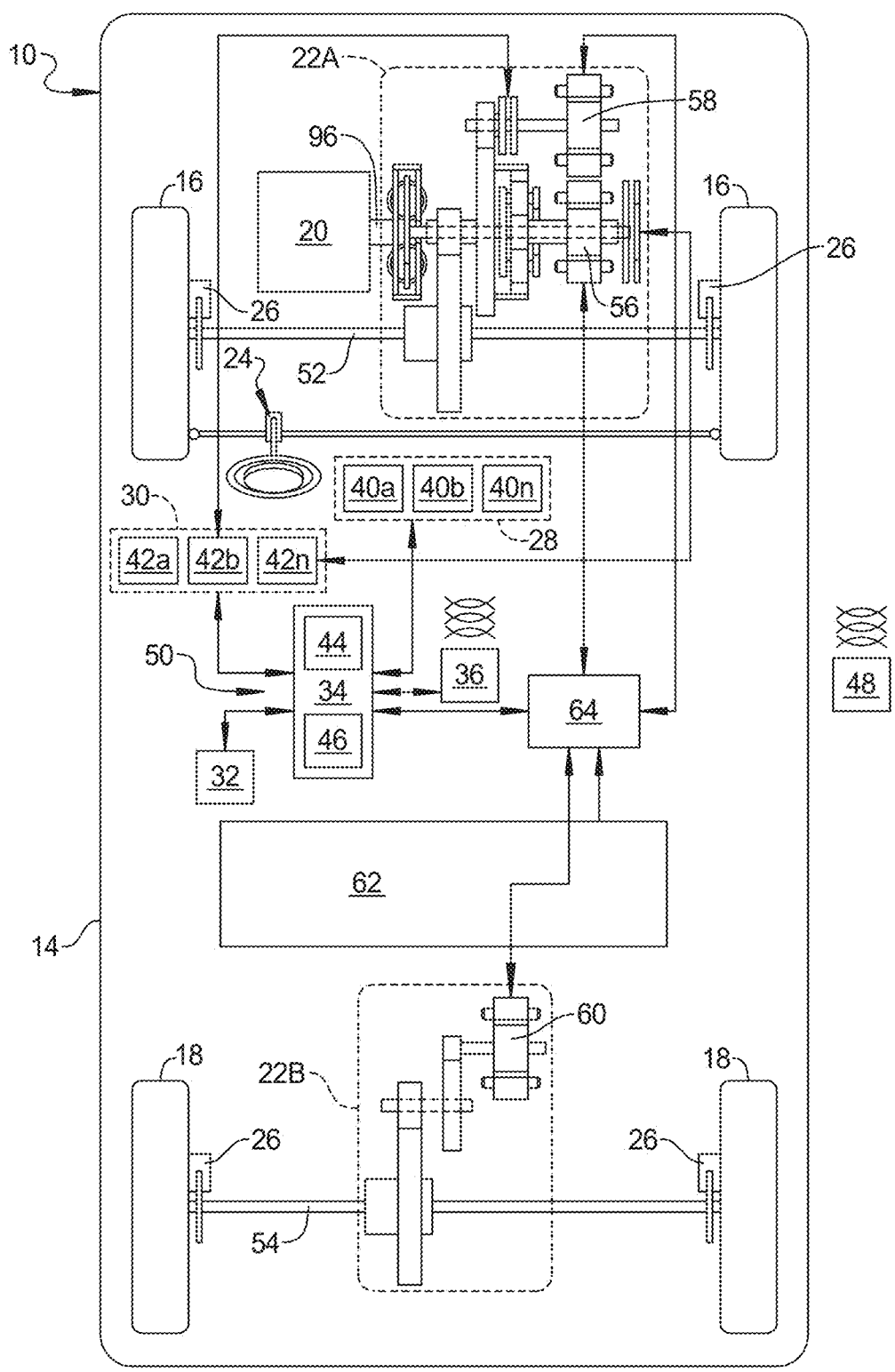
FIG. 1 is a schematic diagram of a vehicle including a hybrid propulsion system according to an exemplary embodiment of the present disclosure.

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application-specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with wheeled or tracked military vehicles, construction and mining vehicles, rail vehicles, aircraft, marine craft, and other vehicles.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges. In addition, disclosure of ranges includes disclosure of all values and further divided ranges within the entire range, including endpoints and sub-ranges given for the ranges.

Example embodiments will now be described more fully with reference to the accompanying drawings. In accordance with an exemplary embodiment, FIG. 1 shows a vehicle 10 with an associated hybrid propulsion system 50 adapted to provide power to a first drive axle 52 and a second drive axle 54. The vehicle 10 generally includes a body 14, front wheels 16 driven by the first drive axle 52, and rear wheels 18 driven by the second drive axle 54. The body 14 substantially encloses components of the vehicle 10. The front wheels 16 and rear wheels 18 are each rotationally coupled to the chassis 12 near a respective corner of the body 14.

In various embodiments, the vehicle 10 is an autonomous vehicle and the system 50 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including trucks, sport utility vehicles (SUVs), recreational vehicles (RVs), etc., can also be used. In an exemplary embodiment, the vehicle 10 is equipped with an automated driving system for all aspects of the dynamic driving task, even if a human user does not respond appropriately to a request to intervene. The system 50 can be utilized to provide information to an autonomous vehicle controller for autonomous maneuvers. The novel aspects of the present disclosure are also applicable to non-autonomous vehicles.

As shown, the vehicle 10 generally includes a hybrid propulsion system 50, including an engine 20, a hybrid transaxle 22A, an electric transaxle 22B, a steering system 24, a brake system 26, a sensor system 28, an actuator system 30, at least one data storage device 32, a vehicle controller 34, and a wireless communication module 36. The hybrid propulsion system 50 may, in various embodiments, include an internal combustion engine 20, a first electric motor/generator 56 and a second electric motor/generator 58 associated with the hybrid transaxle 22A and a third electric motor/generator 60 associated with the electric transaxle 22B. The hybrid transaxle 22A is configured to transmit power from the hybrid propulsion system 50 to the first drive axle and the vehicle's front wheels 16 and the electric transaxle 22B is configured to transmit power from the hybrid propulsion system 50 to the second drive axle 54 and the vehicle's rear wheels 18 to provide forward and reverse propulsion. The hybrid transaxle 22A and the electric transaxle 22B are configured to capture power from the front wheels 16 and rear wheels 18, respectively, to provide regenerative braking. The brake system 26 is configured to provide braking torque to the vehicle's front wheels 16 and rear wheels 18. The brake system 26 may, in various embodiments, include friction brakes, brake by wire, and/or other appropriate braking systems. The steering system 24 influences a position of the front wheels 16 and rear wheels 18. While depicted as including a steering wheel for illustrative purposes, in some embodiments contemplated within the scope of the present disclosure, such as for a fully autonomous vehicle, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10, including providing propulsion and regenerative braking with the hybrid propulsion system 50, control of the engine 20, the hybrid transaxle 22A, and the electric transaxle 22B.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads, including control of propulsion and regenerative braking.

The wireless communication module 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports].

The hybrid propulsion system 50 includes a battery 62 for storing electrical energy. The battery 62 is in communication with a power controller 64 that is adapted to route electrical energy to and from the battery 62. The power controller 64 is connected directly to the battery 62 and each of the first, second and third electric motor/generators 56, 58, 60 and manages flow of electrical energy back and forth between the battery 62 and the first, second and third electric motor/generators 56, 58, 60.

The power controller 64 is in communication with the vehicle controller 34, and, like the vehicle controller 34, is a non-generalized, electronic control device having a preprogrammed digital computer or processor, memory or non-transitory computer readable medium used to store data such as control logic, software applications, instructions, computer code, data, lookup tables, etc., and a transceiver [or input/output ports].

The hybrid transaxle 22A is positioned between and interconnects the engine 20 and the first drive axle 52. In an exemplary embodiment, referring to FIG. 2, the hybrid transaxle 22A includes a planetary gear set 66 including a sun gear 68, planet gears (pinions) 70 rotationally supported on a carrier 72, and a ring gear 74. The carrier 72 is continuously connected to the engine 20. The first electric motor/generator 56 is continuously connected to the sun gear 68 of the planetary gear set 66. Final drive gears 76 are continuously connected to and interconnect the ring gear 74 of the planetary gear set 66 to the first drive axle 52. The second electric motor/generator 58 is selectively connectable to the final drive gears 76 through an intermediary gearset 78 having a single gear ratio.

In an exemplary embodiment, the hybrid transaxle 22A includes a first clutch 80 positioned between the second electric motor/generator 58 and the final drive gears 76. The first clutch 80 is adapted to selectively connect the second electric motor/generator 58 to the final drive gears 76 through the intermediary gearset 78. The first clutch 80 is in communication with the vehicle controller 34, wherein the vehicle controller 34 actuates the first clutch 80 to either connect (first clutch 80 is on) the second electric motor/generator 58 to the final drive gears 76 or to disconnect (first clutch 80 is off) the second electric motor/generator 58 from the final drive gears 76 based on operating conditions of the vehicle 10, for which the vehicle controller 34 gathers data from the plurality of sensors 40*a*-40*n*.

The electric drive axle 22B includes the third electric motor/generator 60 connected to the second drive axle 54. In an exemplary embodiment, the power controller 64 is adapted to provide electrical energy to the third electric motor/generator 60 from the first electric motor/generator 56 when the second electric motor/generator 58 is disconnected from the final drive gears 76 of the hybrid transaxle 22A.

In another exemplary embodiment, the hybrid transaxle 22A of the hybrid propulsion system 50 further includes a brake 82 adapted to selectively stop rotation of the carrier 72 of the planetary gear set 66 (and the engine 20) when the engine 20 is off. The brake 82 is in communication with the vehicle controller 34, wherein the vehicle controller 34 actuates the brake to either prevent rotation of the carrier 72 (brake 82 is on) or to allow rotation of the carrier 72 (brake 82 is off) based on operating conditions of the vehicle 10, for which the vehicle controller 34 gathers data from the plurality of sensors 40*a*-40*n*.

The hybrid propulsion system 50 is operable in different operating modes. For example, the hybrid propulsion system 50 provides an optimized all-electric propulsion mode wherein the hybrid transaxle 22A uses the first electric motor/generator 56 for electric propulsion and has the second electric motor/generator 58 disconnected, so that overall vehicle propulsion is provided by the first electric motor/generator 56 in the hybrid transaxle 22A and the third electric motor/generator 60 in the electric transaxle 22B. Further, the hybrid propulsion system 50 also provides a "split-power-split" hybrid mode of operation in which the engine 20 drives the first electric motor/generator 56 and the first drive axle 52, while the second electric motor/generator 58 is disconnected, and the power generated by the first electric motor/generator 56 is sent to the third electric motor/generator 60 in the electric transaxle 22B, rather than sending that power to the second electric motor/generator 58 in the hybrid transaxle 22A. This confers limited all-wheel-drive that, without the intervention of power from the battery 62, behaves like a center-differential mechanical arrangement with "smart" variable torque bias, thus increasing torque at the second drive axle 54 (rear wheels 18) for acceleration and/or climbing. The split-power-split hybrid mode is active at relatively high vehicle speeds, to reduce motor spin losses and to allow the second electric motor/generator 58 to be equipped with a higher gear ratio than it could otherwise withstand if it were not disconnected at relatively high vehicle speeds. Use of the split-power-split hybrid mode is an alternative to the use of multi-ratio gearing for the second electric motor/generator 58 that enables the hybrid transaxle 22A constructed according to the invention to be simpler, smaller, lighter, and less costly than if it were equipped with multi-ratio gearing or variable-ratio drive for the second electric motor/generator 58. The combination of the higher gear ratio for the second motor/generator 58 enabled by its disconnection at high vehicle speeds and the elimination of the need for multi-ratio gearing by selective use of the split-power-split mode of operation results in the most compact arrangement for the hybrid transaxle 22A and is an advantage in packaging the hybrid propulsion system 50 into the vehicle 10.

In certain operating conditions, the vehicle controller 34 is adapted to actuate the first clutch 80 to disconnect the second electric motor/generator 58 from the final drive gears 76 when the hybrid propulsion system 50 is powering the vehicle 10 with power from the battery 62 and the engine 20 is off to provide all electric power to both the first drive axle 52 and the second drive axle 54. This allows the vehicle 10 to operate in an all-electric all-wheel-drive mode that may include forward propulsion and regenerative braking at all vehicle speeds up to the maximum speed of the vehicle.

In an exemplary embodiment, the vehicle controller 34 is adapted to actuate the first clutch 80 to disconnect the second electric motor/generator 58 (first clutch 80 is off) from the final drive gears 76 when the hybrid propulsion system 50 is powering the vehicle 10 above a first pre-determined vehicle speed that is less than a maximum vehicle speed. This occurs when the hybrid propulsion system 50 is powering the vehicle 10 with electric power from the battery 62, power from the engine 20, or electric power from the battery 62 and power from the engine 20. By way of non-limiting example, if the vehicle's maximum speed is one hundred mph, the first pre-determined speed would be between forty-five to sixty-five mph. The vehicle controller 34 is adapted to actuate the first clutch 80 to connect the second electric motor/generator 58 to the final drive gears 76 (first clutch 80 is on) when the hybrid propulsion system 50 is powering the vehicle 50 below the first pre-determined vehicle speed.

In known hybrid powertrains where an electric motor/generator is connected to a drive axle full-time, the gear ratio of the full-time connected electric motor/generator must be kept low to enable high speed operation. One known method includes disconnecting the rear drive axle at high speeds, but this does not provide for all-wheel-drive.

For better packaging, to reduce the size of an electric motor/generator, a larger gear ratio is required. In the hybrid propulsion system 50 of the present disclosure, the ability to disconnect the second electric motor/generator 58 from the first drive axle 52 allows the second electric motor/generator 58 to be designed with a larger gear ratio, and thus, can be smaller than would be possible with a full-time connection, the same size that would be possible with a multi-speed or variable-ratio connection from the second motor/generator 58 to the final drive gears 76. The ability to disconnect the second electric motor/generator 58 from the first drive axle 52 and to continue power-split hybrid propulsion without including a multi-speed or variable ratio mechanism in the hybrid transaxle 22A provides the packaging benefits of a smaller hybrid transaxle 22A and improves overall efficiency by reducing losses associated with spinning the second electric motor/generator 58. Further, the hybrid propulsion system 50 of the present disclosure provides all-wheel-drive capability.

The input-power-split architecture of the hybrid propulsion system 50 is simple and combines the advantage of continuously variable engine 20 speed and torque control with significantly higher engine 20 power transmission efficiency, especially for cruising, than a series architecture, and includes an electric motor/generator connected directly to the output for more efficient electric propulsion and regenerative braking than a P2 architecture. The hybrid propulsion system 50 improves scalability by allowing a higher gear ratio for the torque-critical output-connected second electric motor/generator 58 in the hybrid transaxle 22A with minimal additional complexity in mechanism or controls and optimized packaging. This advantage creates practical scale-ability of a single-mode input-power-split propulsion system for any vehicle platform, and increases electric propulsion efficiency for increases all-electric range and/or reduced battery 62 cost, improved packaging and vehicle integration.

Figure 4:
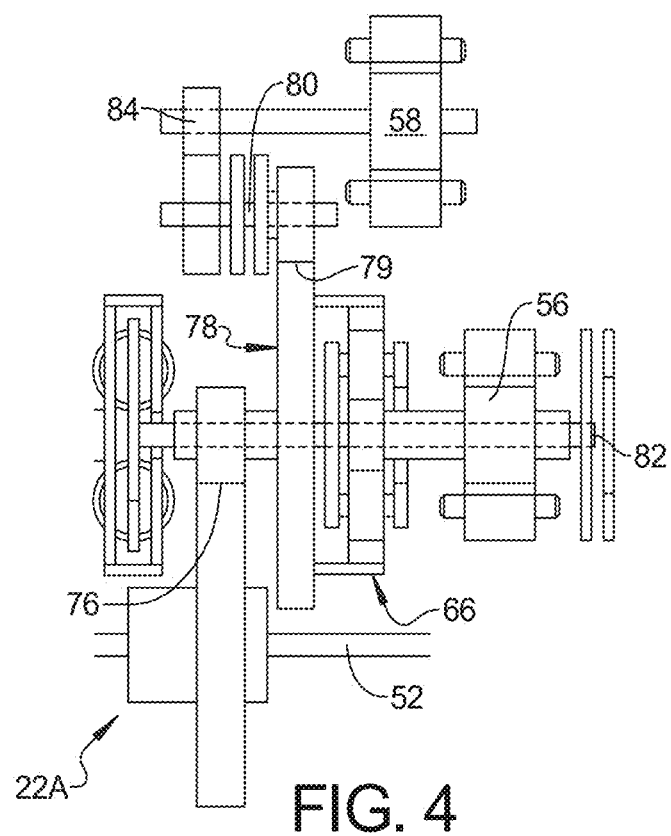
FIG. 4 is a schematic view of a hybrid transaxle having a second intermediary gear set.

Referring to FIG. 3, a chart 106 illustrates the various operating modes provided by the hybrid propulsion system 50. For illustrative purposes, and by way of non-limiting example, the first pre-determined speed is fifty miles per hour (MPH). Thus, the $3^{rd}$, $4^{th}$ and $5^{th}$ modes of operation shown in the chart of FIG. 4 are enabled by the first clutch 80 and the ability to disconnect the second electric motor/generator 58 at vehicle speeds in excess of fifty MPH. Further, in all-electric operation, it can be seen that the brake 82 is on in each of the $3^{rd}$, $4^{th}$ and $5^{th}$ operating modes. The brake 82 enables high speed all-electric all-wheel-drive operation of the hybrid propulsion system 50, and, further, enables regenerative braking (mode 5) when decelerating from speeds in excess of fifty MPH when the second electric motor/generator 58 is disconnected.

The $2^{nd}$ mode of operation, acceleration from zero to sixty mph, shows the first clutch 80 engaged, with the second electric motor/generator 58 connected, throughout the acceleration. It should be noted, that with the actual complex controls, the speed of disconnection of the first clutch 80 will vary somewhat based on output torque to the axle (determining whether the second electric motor/generator 58 torque is needed or not) and acceleration (how fast the first clutch 80 can be disconnected) somewhat above and below fifty MPH. Thus, practical reality is that the first clutch 80 will disengage somewhere between slightly below fifty mph and sixty MPH.

In another exemplary embodiment, when operating in a hybrid mode of operation, the vehicle controller 34 is adapted to actuate the first clutch 80 to disconnect the second electric motor/generator 58 from the final drive gears 76 and power is provided to the first electric motor/generator 56 and to the first drive axle 52 from the engine 20 and power is provided to the third electric motor/generator 60 by the first electric motor/generator 56.

Referring to FIG. 4, in an exemplary embodiment, the hybrid transaxle 22A of the hybrid propulsion system 50 includes an intermediary gearset 78 consisting of two stages. A first stage 79 is positioned between and interconnecting the first clutch 80 at a first-stage ratio and the final drive gears 76. A second stage 84 is positioned between and interconnecting the second electric motor/generator 58 and the first clutch 80 at a second-stage gear ratio, wherein, when the first clutch 80 is actuated to transfer power from the second electric motor/generator 58, power from the second electric motor/generator 58 is transferred to the final drive gears 76 at a multi-stage single gear ratio through the intermediary gearset 78.

Figure 5:
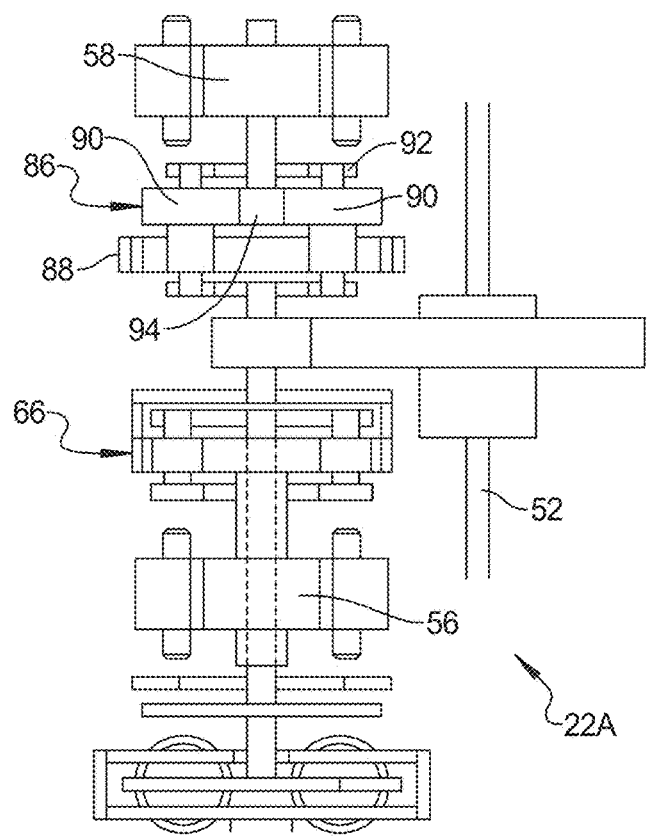
FIG. 5 is a schematic view of a hybrid transaxle wherein the first clutch is a second planetary gear set.

Referring to FIG. 5, in another exemplary embodiment, the first clutch 80 comprises a second planetary gear set 86 including a ring gear 88 that is selectively held stationary, a plurality of planet pinions 90 rotatably supported on a carrier 92, and a sun gear 94 continuously engaged with the second electric motor/generator 58. The ring gear 88 of the second planetary gearset 86 is held stationary by a clutch or brake (not shown) that is in communication with the vehicle controller 34. Wherein, when the ring gear 88 is held stationary, the second planetary gear set 86 transfers power from the second electric motor/generator 58 to the final drive gears 76, and, when the ring gear 88 is not held stationary, the second planetary gear set 86 does not transfer power from the second electric motor/generator 58 to the final drive gears 76.

The second planetary gearset 86 acts like a disconnect clutch, wherein when the ring gear 88 is held, power is transferred through the second planetary gearset 86 (the "clutch" is on), and when the ring gear 88 is allowed to freely rotate, power is not transferred through the second planetary gearset 86 (the "clutch" is off). When the ring gear 88 is held, rotation of the sun gear 94 by the second electric motor/generator 58 causes the planet pinions 90 to rotate, and, because the ring gear 88 is held stationary, the planet pinions 90 "walk" around the ring gear 88 causing the carrier 92 to rotate. Interconnection between the carrier 92 and the final drive gears 76 transfers power from the rotating carrier 92 to the first drive axle 52. When the ring gear 88 is not held, rotation of the sun gear 94 by the second electric motor/generator 58 caused the planet pinions 90 to rotate, however, because the ring gear 88 is not held stationary, rotation of the planet pinions 90 simply rotates the ring gear 88 around the carrier 92, and the carrier remains stationary, transferring no power to the final drive gears. In an exemplary embodiment, the second planetary gearset is a stepped pinion planetary gearset providing a single gear ratio.

Figure 6:
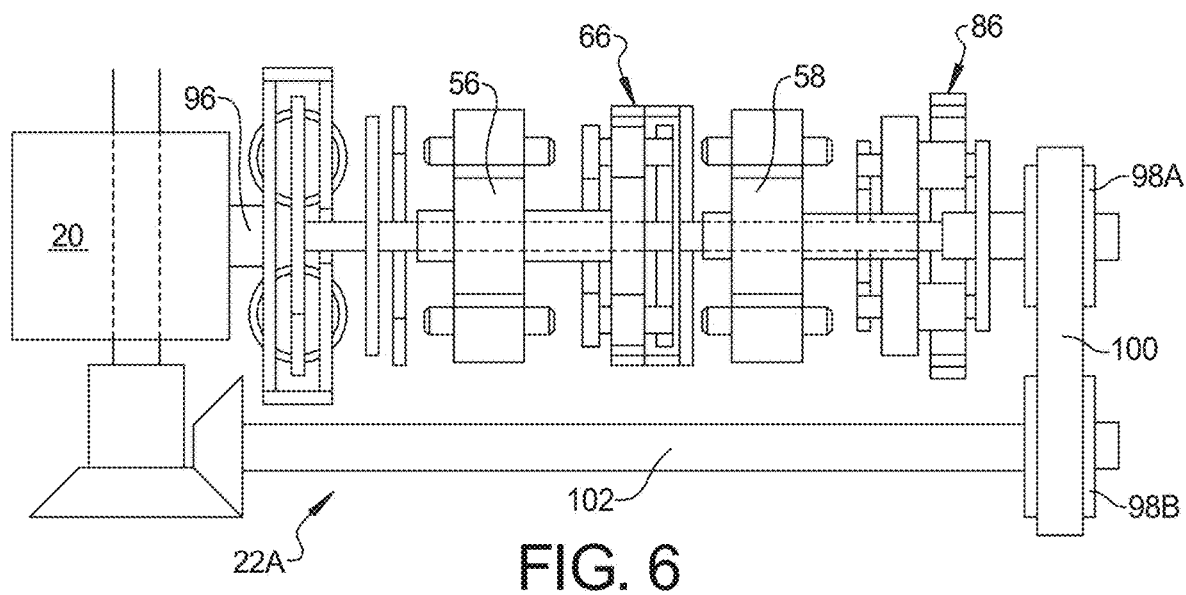
FIG. 6 is a hybrid transaxle wherein an engine crankshaft is oriented perpendicular to the first drive axle.

Referring to FIG. 1, FIG. 2, FIG. 4 and FIG. 5, in an exemplary embodiment, the hybrid transaxle 22A is oriented wherein an engine crankshaft 96 is parallel to the first drive axle 52. Referring to FIG. 6, in another exemplary embodiment, the hybrid transaxle 22A is oriented wherein the engine crankshaft 96 is perpendicular to the first drive axle 52. As shown in FIG. 6, power is routed to the first drive axle 52 via pulleys 98A, 98B and a chain or belt 100 to a parallel drive shaft 102.

Figure 7:
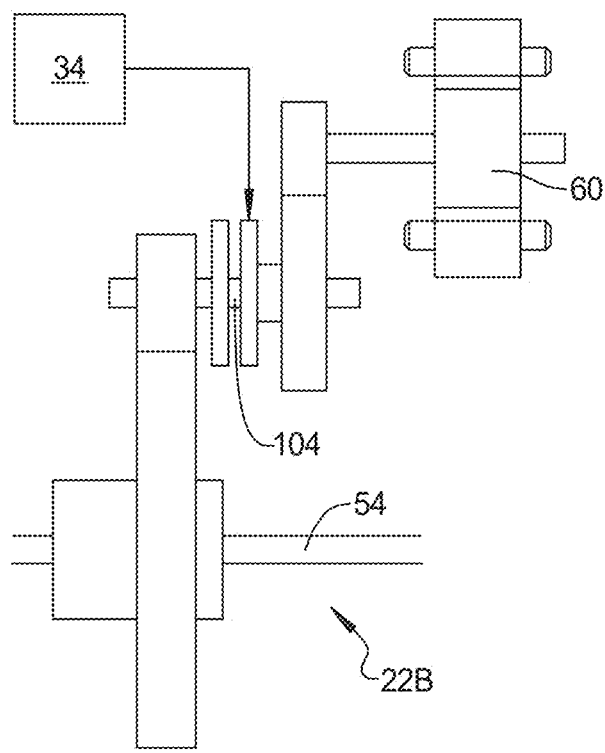
FIG. 7 is a schematic view of an electric transaxle having a second clutch.

Referring to FIG. 7, in another exemplary embodiment, the electric transaxle 22B includes a second clutch 104 positioned between the third electric motor/generator 60 and the second drive axle 54, the second clutch 104 adapted to selectively connect the third electric motor/generator 60 to the second drive axle 54. The second clutch 104 is in communication with the vehicle controller 34, wherein the vehicle controller 34 actuates the second clutch 104 to either connect (second clutch 104 is on) the third electric motor/generator 60 to the second drive axle 54 or to disconnect (second clutch 104 is off) the third electric motor/generator 60 from the second drive axle 54 based on operating conditions of the vehicle 10, for which the vehicle controller 34 gathers data from the plurality of sensors 40*a*-40*n*.

Figure 8:
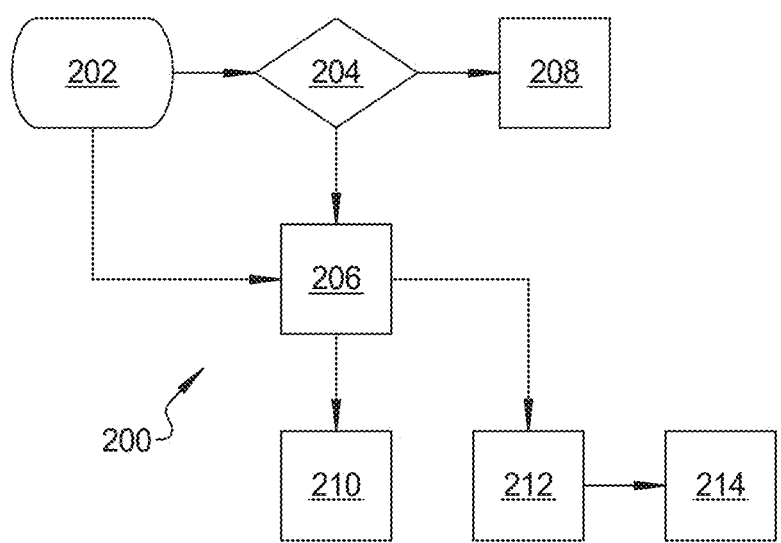
FIG. 8 is a flow chart illustrating a method of operating the hybrid propulsion system of FIG. 1.

Referring to FIG. 8, a method 200 of operating a hybrid propulsion system 50 for a vehicle 10, wherein the hybrid propulsion system 50 includes a battery 62 for storing electrical energy, a power controller 64 adapted to route electrical energy to and from the battery 62, a hybrid transaxle 22A positioned between and interconnecting an engine 20 and a first drive axle 52, the hybrid transaxle 22A including a planetary gear set 66 including a sun gear 68, planet gears 70 rotationally supported on a carrier 72, and a ring gear 74, the carrier 72 continuously connected to the engine 20, a first electric motor/generator 56 continuously connected to the sun gear 68 of the planetary gear set 66, final drive gears 76 continuously connected to and interconnecting the ring gear 74 of the planetary gear set 66 to the first drive axle 52, a second electric motor/generator 58 selectively connectable to the final drive gears 76 through an intermediary gearset 78 having a single gear ratio, and a first clutch 80 positioned between the second electric motor/generator 58 and the final drive gears 76, the first clutch 80 adapted to selectively connect the second electric motor/generator 58 to the final drive gears 76 through the intermediary gearset 78, an electric transaxle 22B including a third electric motor/generator 60 connected to a second drive axle 54, the power controller 64 adapted to provide electrical energy to the third electric motor/generator 60 from the first electric motor/generator 56 when the second electric motor/generator 58 is disconnected from the final drive gears 76 of the hybrid transaxle 22A, and a brake 82 adapted to selectively stop rotation of the carrier 72 of the planetary gearset 66 when the engine 20 is off, the method 200 including, beginning at block 202, and moving to block 204, if, at block 204, the hybrid propulsion system 50 is powering the vehicle 10 above a first pre-determined vehicle speed that is less than a maximum vehicle speed, then, moving to block 206, the method 200 includes actuating, with a vehicle controller 34 in communication with the power controller 64, the first clutch 80, the brake 82 and sensors 40a-40n within the vehicle 10, the first clutch 80 and disconnecting the second electric motor/generator 58 from the final drive gears 76.

If, at block 204, the hybrid propulsion system 50 is powering the vehicle 10 below a first pre-determined vehicle speed, then, moving to block 208, the method 200 includes actuating, with the vehicle controller 34, the first clutch 80 and connecting the second electric motor/generator 58 to the final drive gears 76.

In another exemplary embodiment, moving to block 210, the method 200 includes actuating the first clutch 80 to disconnect the second electric motor/generator 58 from the final drive gears 76 when the hybrid propulsion system 50 is powering the vehicle with power from the battery 62 and the engine 20 is off to provide all electric power to both the first drive axle 52 and the second drive axle 54, thus providing all electric AWD.

In another exemplary embodiment, when operating in a hybrid mode of operation, and after actuating, with the vehicle controller 34, the first clutch 80 to disconnect the second electric motor/generator 58 from the final drive gears 76 at block 206, moving to block 212, the method 200 includes, providing power to the first electric motor/generator 56 and to the first drive axle 52 from the engine 20, and, moving to block 214, providing power to the third electric motor/generator 60 from the first electric motor/generator 56.

Hybrid propulsion systems generally have a greater number of major components, greater mass of the propulsion system, and greater difficulty in packaging all of the components into the vehicle 10 without enlarging its outside dimensions or reducing its interior space for passengers and cargo. The demands of hybrid-electric vehicles require use of electric motors that can provide torque and power needed to power the vehicle in various operating conditions. Larger electric motors provide more torque and power, but also come with larger mechanical losses, weight, and packaging issues. Smaller electric motors have better packaging, mass and mechanical loss characteristics, but may not be able to provide sufficient torque and power to the vehicle at all operating conditions.

The hybrid propulsion system 50 and method 200 of the present disclosure provides efficient, cost-effective, scalable electric and hybrid propulsion for a wide range of hybrid electric vehicles (HEVs) and plug-in hybrid electric vehicles (PHEVs) with electric all-wheel-drive (AWD). The hybrid propulsion system 50 and method 200 of the present disclosure optimizes electric propulsion at highway speeds and low power, such as typical highway cruising, by mechanically disconnecting the larger second electric motor/generator 58 in the hybrid transaxle 22A and using the electric drive axle 22B to complete hybrid power-split operation. This provides a special synergy with electric AWD, because it leaves both the smaller first electric motor-generator 56 in front and the third electric motor/generator 60 in the rear operational for electric propulsion and regenerative braking and it enables hybrid split-power-split operation using the third electric motor/generator 60. Because the second electric motor/generator 58 in the hybrid transaxle 22A is always disconnected above an intermediate vehicle speed (the first predetermined speed, e.g. fifty mph vehicle speed vs. one hundred mph maximum vehicle speed), the torque-multiplying gear ratio of the second electric motor/generator 58 can be higher (e.g. 2×) for more output torque, improving scalability of the hybrid propulsion system 50. This is beneficial if the vehicle 10 has requirements for high peak torque from each of its axles 52 and 54, such as for driving over rough terrain, or the vehicle 10 has a requirement for relatively high reverse hybrid propulsion torque from the axle connected to the hybrid transaxle 22A, such as the front axle 52, reverse torque that may be provided by the second electric motor/generator 58 while overcoming the forward torque produced by the engine 20 and first motor/generator 56 when producing power for the second and third electric motor/generators 58 and 60.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A hybrid propulsion system for a vehicle, comprising:
a battery for storing electrical energy;
a power controller adapted to route electrical energy to and from the battery;
a hybrid transaxle positioned between and interconnecting an engine and a first drive axle, the hybrid transaxle including:
a planetary gear set including a sun gear, planet gears rotationally supported on a carrier, and a ring gear, the carrier continuously connected to the engine;
a first electric motor/generator continuously connected to the sun gear of the planetary gear set;
final drive gears continuously connected to and interconnecting the ring gear of the planetary gear set to the first drive axle; and
a second electric motor/generator selectively connectable to the final drive gears through an intermediary gearset having a single gear ratio.

2. The hybrid propulsion system of claim 1 further including a first clutch positioned between the second electric motor/generator and the final drive gears, the first clutch adapted to selectively connect the second electric motor/generator to the final drive gears through the intermediary gearset.

3. The hybrid propulsion system of claim 2 further including an electric drive axle including a third electric motor/generator connected to a second drive axle, the power controller adapted to provide electrical energy to the third electric motor/generator from the first electric motor/generator when the second electric motor/generator is disconnected from the final drive gears of the hybrid transaxle.

4. The hybrid propulsion system of claim 3 further including a brake adapted to selectively stop rotation of the carrier of the planetary gear set when the engine is off.

5. The hybrid propulsion system of claim 4 further including a vehicle controller in communication with the power controller, the first clutch, the brake and sensors within the vehicle;
   wherein, the vehicle controller is adapted to actuate the first clutch to disconnect the second electric motor/generator from the final drive gears when the hybrid propulsion system is powering the vehicle with power from the battery and the engine is off to provide all electric power to both the first drive axle and the second drive axle.

6. The hybrid propulsion system of claim 4 further including a vehicle controller in communication with the power controller, the first clutch, the brake and sensors within the vehicle;
   wherein, the vehicle controller is adapted to actuate the first clutch to disconnect the second electric motor/generator from the final drive gears when the hybrid propulsion system is powering the vehicle above a first pre-determined vehicle speed that is less than a maximum vehicle speed and when the hybrid propulsion system is powering the vehicle with one of:
      electric power from the battery;
      power from the engine; or
      electric power from the battery and power from the engine.

7. The hybrid propulsion system of claim 6, wherein the vehicle controller is adapted to actuate the first clutch to connect the second electric motor/generator to the final drive gears when the hybrid propulsion system is powering the vehicle below the first pre-determined vehicle speed.

8. The hybrid propulsion system of claim 7, wherein, when operating in a hybrid mode of operation, the vehicle controller is adapted to actuate the first clutch to disconnect the second electric motor/generator from the final drive gears and power is provided to the first electric motor/generator and to the first drive axle from the engine and power is provided to the third electric motor/generator by the first electric motor/generator.

9. The hybrid propulsion system of claim 7, wherein the intermediary gear set includes a first stage and a second stage positioned between and interconnecting the second electric motor/generator and the final drive gears, wherein, when the first clutch is actuated to transfer power from the second electric motor/generator, power from the second electric motor/generator is transferred to the final drive gears at a multi-stage single gear ratio through the first and second stages of the intermediary gear set.

10. The hybrid propulsion system of claim 7, wherein first clutch comprises a second planetary gear set including:
   a ring gear that is selectively held stationary;
   a plurality of planet pinions supported on a carrier; and
   a sun gear continuously engaged with the second electric motor/generator; wherein:
      when the ring gear is held stationary, the second planetary gear set transfers power from the second electric motor/generator to the final drive gears; and
      when the ring gear is not held stationary, second planetary gear set does not transfer power from the second electric motor/generator to the final drive gears.

11. The hybrid propulsion system of claim 7, wherein the hybrid transaxle is oriented wherein an engine crankshaft is parallel to the first drive axle.

12. The hybrid propulsion system of claim 7, wherein the hybrid transaxle is oriented wherein an engine crankshaft is perpendicular to the first drive axle.

13. The hybrid propulsion system of claim 7, wherein the electric transaxle includes a second clutch positioned between the third electric motor/generator and the second drive axle, the second clutch adapted to selectively connect the third electric motor/generator to the second drive axle.

14. A method of operating a hybrid propulsion system for a vehicle, the hybrid propulsion system comprising:
   a battery for storing electrical energy;
   a power controller adapted to route electrical energy to and from the battery;
   a hybrid transaxle positioned between and interconnecting an engine and a first drive axle, the hybrid transaxle including:
      a planetary gear set including a sun gear, planet gears rotationally supported on a carrier, and a ring gear, the carrier continuously connected to the engine;
      a first electric motor/generator continuously connected to the sun gear of the planetary gear set;
      final drive gears continuously connected to and interconnecting the ring gear of the planetary gear set to the first drive axle;
      a second electric motor/generator selectively connectable to the final drive gears through an intermediary gearset having a single gear ratio; and
      a first clutch positioned between the second electric motor/generator and the final drive gears, the first clutch adapted to selectively connect the second electric motor/generator to the final drive gears through the intermediary gearset;
   an electric transaxle including a third electric motor/generator connected to a second drive axle, the power controller adapted to provide electrical energy to the third electric motor/generator from the first electric motor/generator when the second electric motor/generator is disconnected from the final drive gears of the hybrid transaxle; and
   a brake adapted to selectively stop rotation of the carrier of the planetary gear set when the engine is off;
   the method including:
      actuating, with a vehicle controller in communication with the power controller, the first clutch, the brake and sensors within the vehicle, the first clutch and disconnecting the second electric motor/generator from the final drive gears when the hybrid propulsion system is powering the vehicle above a first pre-determined vehicle speed that is less than a maximum vehicle speed.

15. The method of claim 14, further including actuating, with the vehicle controller, the first clutch and connecting the second electric motor/generator to the final drive gears when the hybrid propulsion system is powering the vehicle below the first pre-determined vehicle speed.

16. The method of claim 14, further including actuating the first clutch to disconnect the second electric motor/generator from the final drive gears when the hybrid propulsion system is powering the vehicle with power from the battery and the engine is off to provide all electric power to both the first drive axle and the second drive axle.

17. The method of claim 14, further including, when operating in a hybrid mode of operation:

actuating, with the vehicle controller, the first clutch to disconnect the second electric motor/generator from the final drive gears;
providing power to the first electric motor/generator and to the first drive axle from the engine; and
providing power to the third electric motor/generator from the first electric motor/generator.

18. A vehicle having a hybrid propulsion system, the hybrid propulsion system comprising:
a battery for storing electrical energy;
a power controller adapted to route electrical energy to and from the battery;
a hybrid transaxle positioned between and interconnecting an engine and a first drive axle, the hybrid transaxle including:
a planetary gear set including a sun gear, planet gears rotationally supported on a carrier, and a ring gear, the carrier continuously connected to the engine;
a first electric motor/generator continuously connected to the sun gear of the planetary gear set;
final drive gears continuously connected to and interconnecting the ring gear of the planetary gear set to the first drive axle;
a second electric motor/generator selectively connectable to the final drive gears through an intermediary gearset having a single gear ratio; and
a first clutch positioned between the second electric motor/generator and the final drive gears, the first clutch adapted to selectively connect the second electric motor/generator to the final drive gears through the intermediary gearset;
an electric drive axle including a third electric motor/generator connected to a second drive axle, the power controller adapted to provide electrical energy to the third electric motor/generator from the first electric motor/generator when the second electric motor/generator is disconnected from the final drive gears of the hybrid transaxle;
a brake adapted to selectively stop rotation of the carrier of the planetary gear set when the engine is off; and
a vehicle controller in communication with the power controller, the first clutch, the brake and sensors within the vehicle;
wherein, at least one of:
the vehicle controller is adapted to actuate the first clutch to disconnect the second electric motor/generator from the final drive gears when the hybrid propulsion system is powering the vehicle with power from the battery and the engine is off to provide all electric power to both the first drive axle and the second drive axle;
the vehicle controller is adapted to actuate the first clutch to disconnect the second electric motor/generator from the final drive gears when the hybrid propulsion system is powering the vehicle above a first pre-determined vehicle speed that is less than a maximum vehicle speed; and
the vehicle controller is adapted to actuate the first clutch to connect the second electric motor/generator from the final drive gears when the hybrid propulsion system is powering the vehicle below the first pre-determined vehicle speed.

19. The vehicle of claim 18, wherein, when operating in a hybrid mode of operation, the vehicle controller is adapted to actuate the first clutch to disconnect the second electric motor/generator from the final drive gears and power is provided to the first electric motor/generator and to the first drive axle from the engine and power is provided to the third electric motor/generator by the first electric motor/generator.

20. The vehicle of claim 18, wherein the intermediary gear set includes a first stage and a second stage positioned between and interconnecting the second electric motor/generator and the final drive gears, wherein, when the first clutch is actuated to transfer power from the second electric motor/generator, power from the second electric motor/generator is transferred to the final drive gears at a multi-stage single gear ratio through the first and second stages of the intermediary gear set;
a second clutch positioned between the third electric motor/generator and the second drive axle, the second clutch adapted to selectively connect the third electric motor/generator to the second drive axle; and
wherein, the first clutch comprises a second planetary gear set including:
a ring gear that is selectively held stationary;
a plurality of planet pinions supported on a carrier; and
a sun gear continuously engaged with the second electric motor/generator;
wherein:
when the ring gear is held stationary, the second planetary gear set transfers power from the second electric motor/generator to the final drive gears; and
when the ring gear is not held stationary, second planetary gear set does not transfer power from the second electric motor/generator to the final drive gears.

* * * * *